Figure 1:
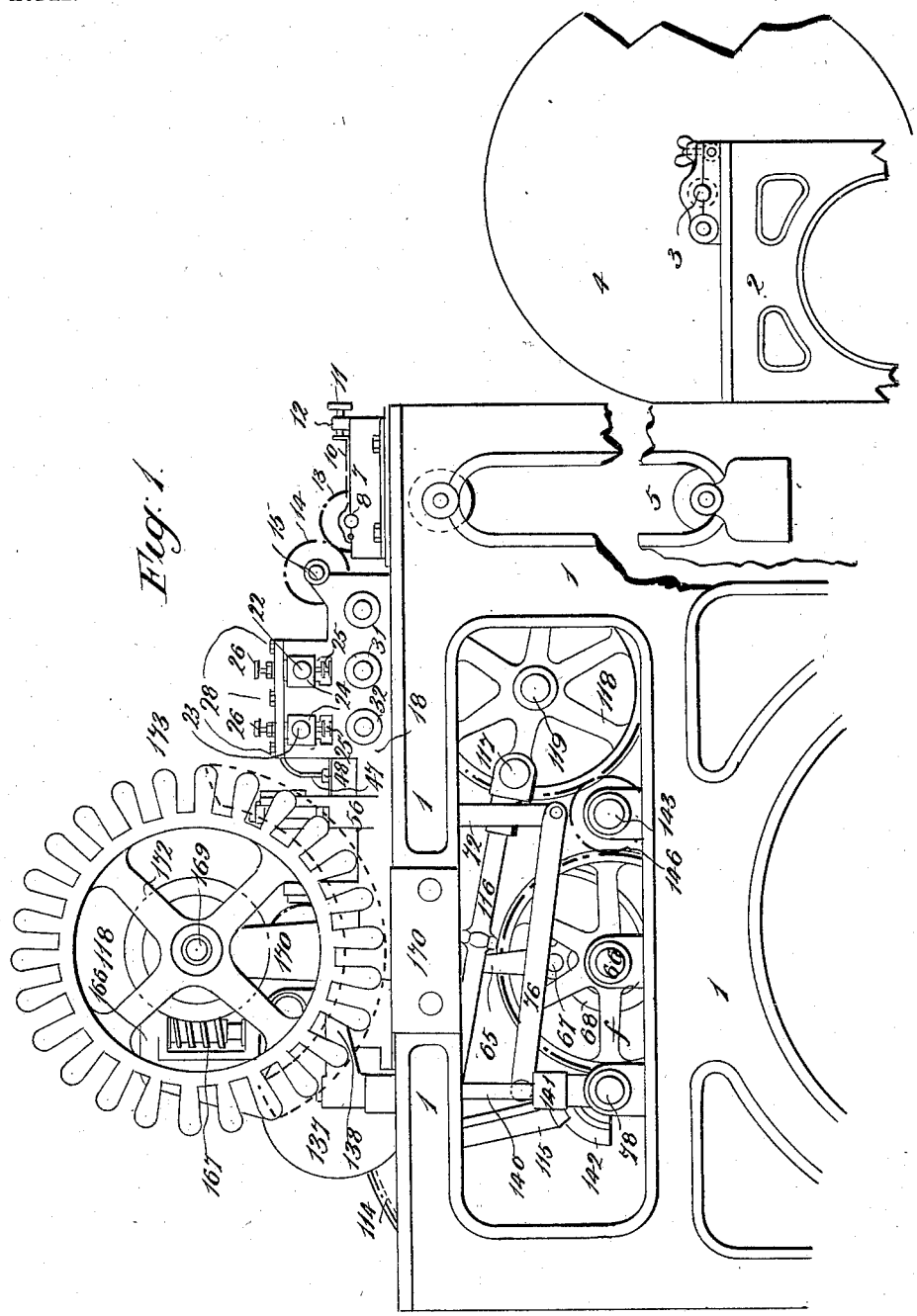

No. 726,553. PATENTED APR. 28, 1903.
E. C. LOVELL.
MACHINE FOR MAKING CARTONS.
APPLICATION FILED SEPT. 3, 1902.
NO MODEL. 9 SHEETS—SHEET 1.

Witnesses:
Herbert J. Smith.
Fred. E. Maynard.

Inventor·
Edward C. Lovell
By his Attorney
F. H. Richards

No. 726,553. PATENTED APR. 28, 1903.
E. C. LOVELL.
MACHINE FOR MAKING CARTONS.
APPLICATION FILED SEPT. 3, 1902.
NO MODEL. 9 SHEETS—SHEET 3.

Witnesses:
Herbert J. Smith.
Fred E. Maynard.

Inventor:
Edward C. Lovell.
By his Attorney.
J. H. Richards

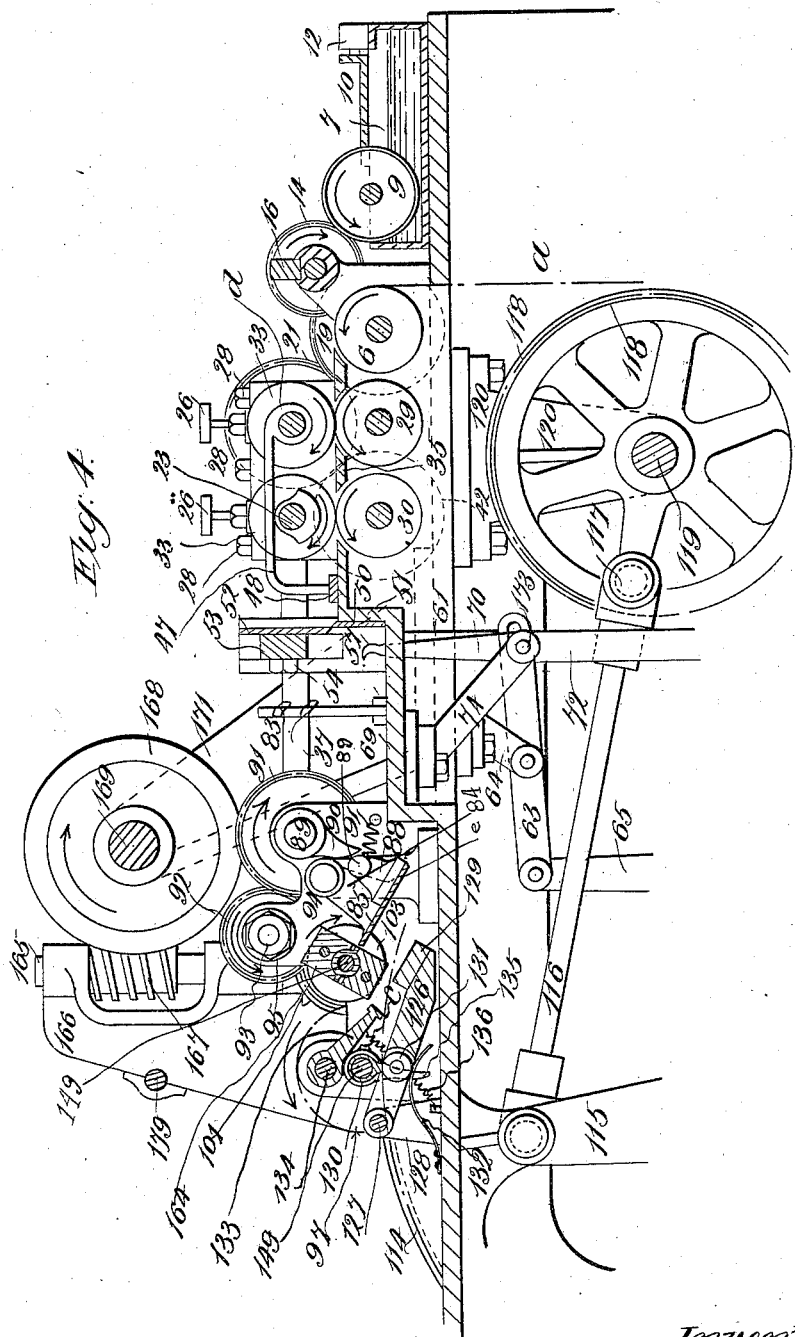

No. 726,553. PATENTED APR. 28, 1903.
E. C. LOVELL.
MACHINE FOR MAKING CARTONS.
APPLICATION FILED SEPT. 3, 1902.
NO MODEL.
9 SHEETS—SHEET 5.
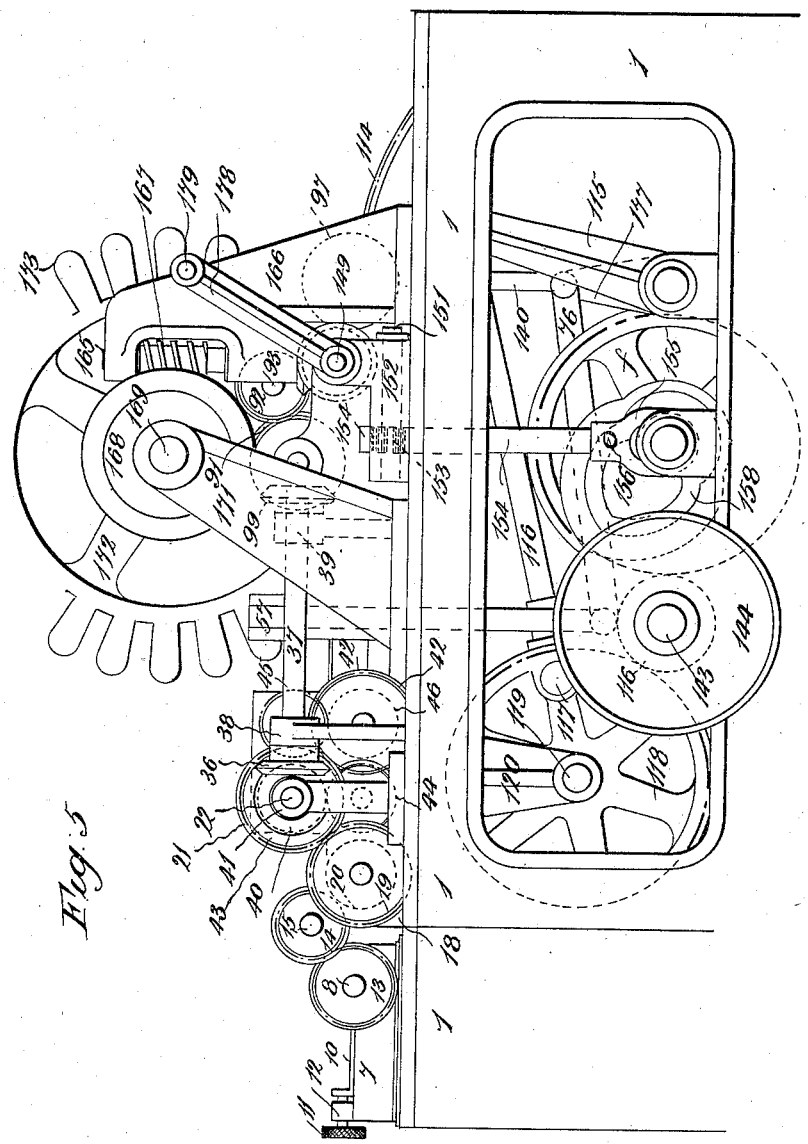
Witnesses
Herbert J. Smith
Fred E. Maynard
Inventor:
Edward C. Lovell
By his Attorney
F. H. Richards No. 726,553. PATENTED APR. 28, 1903.
E. C. LOVELL,
MACHINE FOR MAKING CARTONS.
APPLICATION FILED SEPT. 3, 1902.
NO MODEL. 9 SHEETS—SHEET 6.
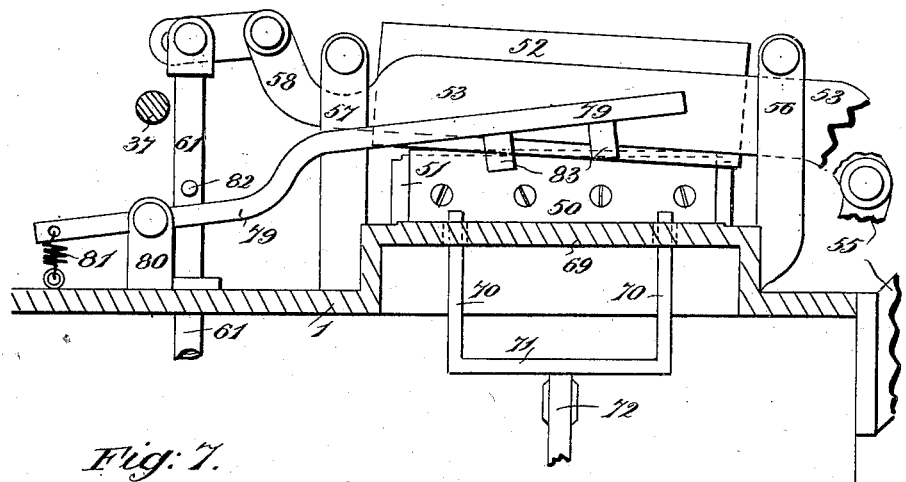
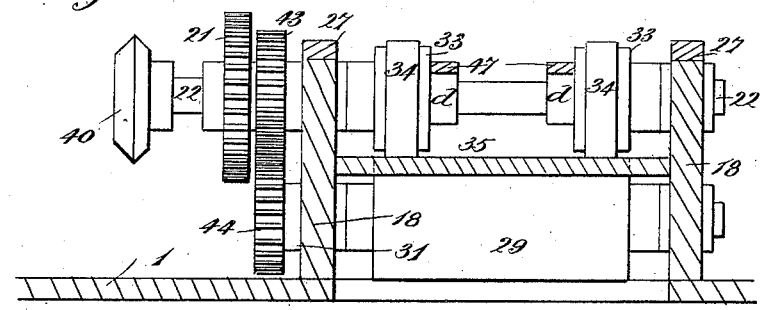
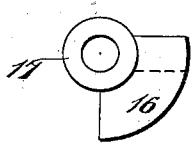
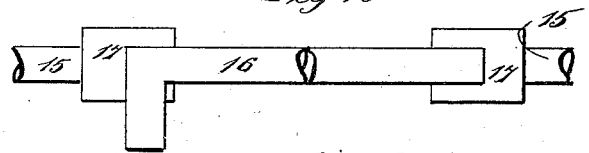
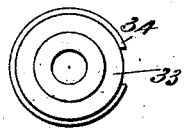
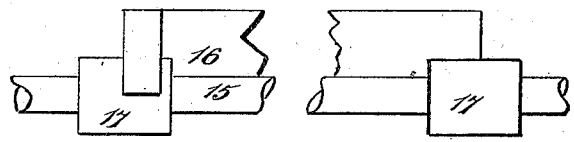
Witnesses:
Herbert J. Smith
Fred E. Maynard
Inventor:
Edward C. Lovell
By his Attorney
J. H. Richards No. 726,553. PATENTED APR. 28, 1903.
E. C. LOVELL.
MACHINE FOR MAKING CARTONS.
APPLICATION FILED SEPT. 3, 1902.
NO MODEL. 9 SHEETS—SHEET 7.
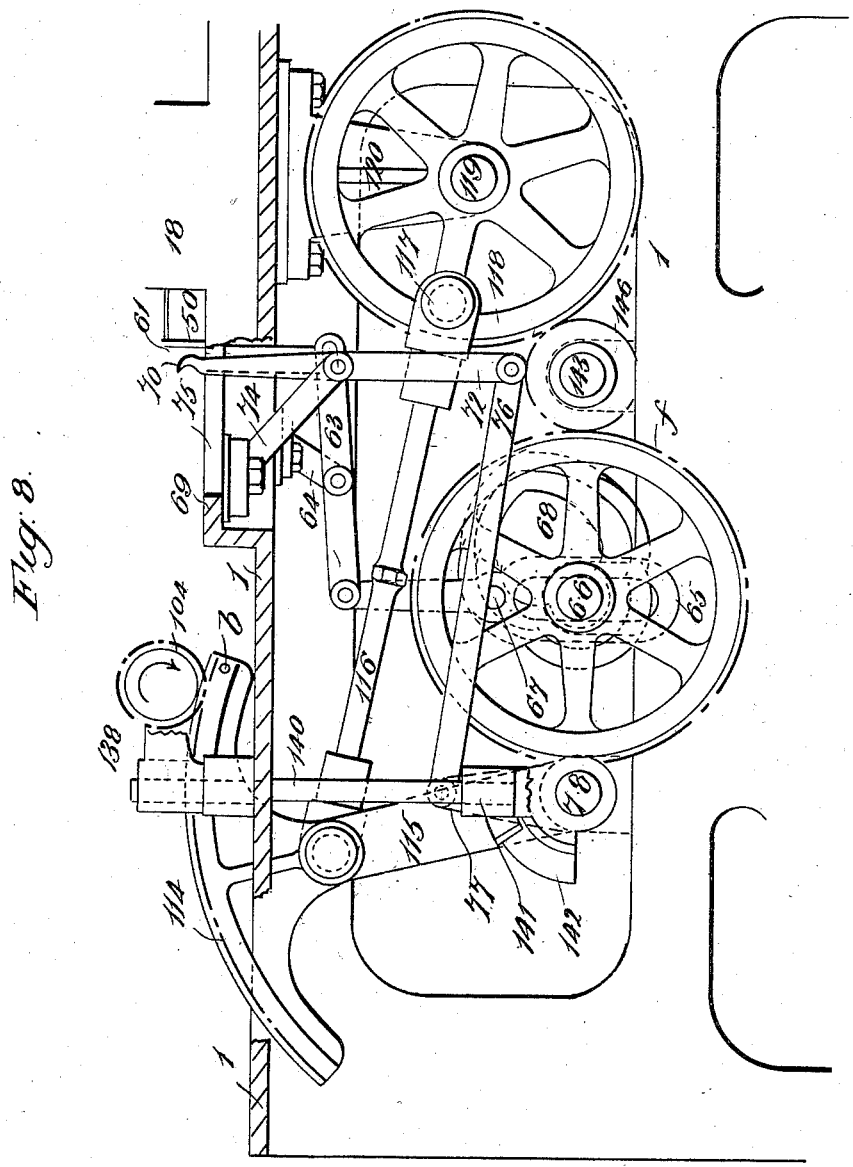
Witnesses:
Herbert J. Smith
Fred E. Maynard
Inventor:
Edward C. Lovell
By his Attorney
J. H. Richards No. 726,553. PATENTED APR. 28, 1903.
E. C. LOVELL.
MACHINE FOR MAKING CARTONS.
APPLICATION FILED SEPT. 3, 1902.
NO MODEL. 9 SHEETS—SHEET 8.
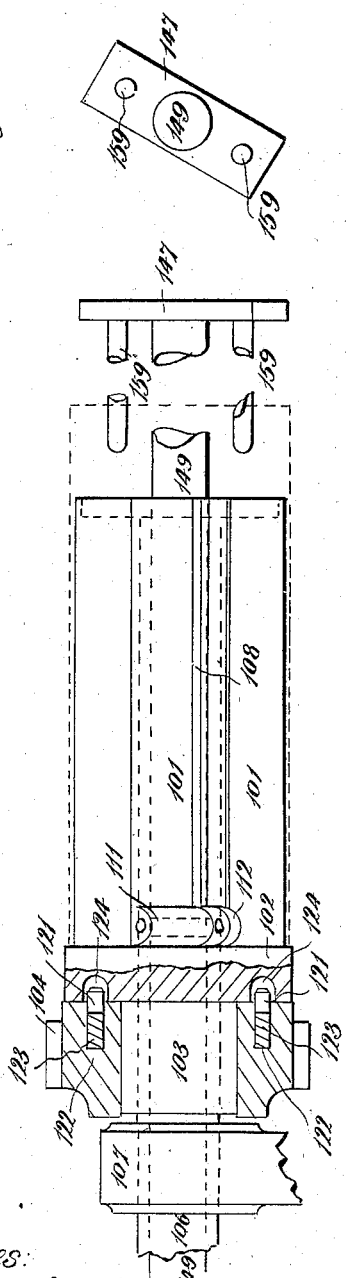
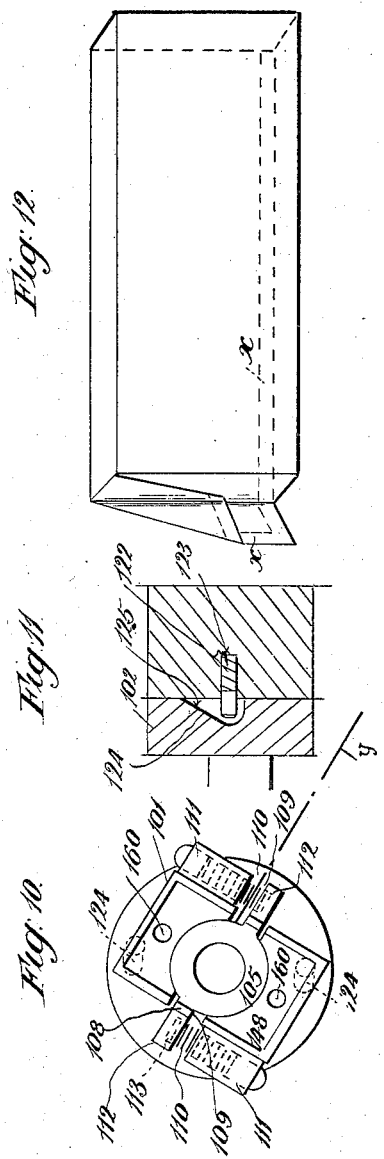
Witnesses:
Herbert J. Smith.
Fred E. Maynard.
Inventor
Edward C. Lovell.
By his Attorney
J. H. Richards No. 726,553. PATENTED APR. 28, 1903.
E. C. LOVELL.
MACHINE FOR MAKING CARTONS.
APPLICATION FILED SEPT. 3, 1902.
NO MODEL. 9 SHEETS—SHEET 9.

Witnesses:
Herbert J. Smith
Fred E. Maynard.

Inventor:
Edward C. Lovell
By his Attorney
F. H. Richards

UNITED STATES PATENT OFFICE.

EDWARD COLSTON LOVELL, OF MONTPELIER, ENGLAND.

MACHINE FOR MAKING CARTONS.

SPECIFICATION forming part of Letters Patent No. 726,553, dated April 28, 1903.

Application filed September 3, 1902. Serial No. 121,938. (No model.)

*To all whom it may concern:*

Be it known that I, EDWARD COLSTON LOVELL, engineer, a subject of the King of Great Britain and Ireland, residing at 109 Chesterfield road, Montpelier, Bristol, England, have invented certain new and useful Improvements in Machines for Making Cartons, of which the following is a specification.

The object of the present invention is to produce a machine for the manufacture of bags or packets of paper of rectangular form having one end closed and sealed and the other end left open, so as to permit the said bag or packet to be filled.

A further object of the invention is to provide simple and effective means whereby the bags or packets when completed are placed in an outer case or carton. By this latter means a great saving of time and space is effected, as the hand labor heretofore employed to place the bags or packets within the cartons is dispensed with, and instead of the bags and cartons being stored separately the one is contained within the other and a great saving of room effected. The bags or packets are formed by the machine from a continuous web of paper, and the outer cases or cartons in which they are inserted are formed by other means and placed by hand in a suitable carrier-wheel, where they remain until the inner case has been inserted therein, when they are ejected from the machine. The web from which the bags or cases are formed is placed upon a suitable support, which may be formed integral with the frame of the machine, and is led around guide-rollers to a suitable gumming device which applies an adhesive to the margin of one side of the paper, along the longitudinal edge thereof and also partly along the transverse edge of the upper surface of the paper, which thus has impressed upon it an adhesive-coated surface resembling in outline a letter L, the longer member of which is upon the longitudinal edge and the shorter member upon the transverse edge of the paper. The paper when gummed is passed, by means of suitable intermittently-actuated feed-rollers, to a cutting device comprising a movable and a fixed blade arranged transversely of the paper, the said movable blade being operated intermittently, so as to sever a length of paper suitable to form one bag, such length then being presented to and its foremost longitudinal edge held by a former, around which the paper length is wrapped. The former is arranged transversely of the web and rotated intermittently by means of suitable gearing which, in combination with a clutch, causes the motion of the former to be in one direction only. The forward longitudinal edge of the paper is presented to the former, which is provided with means designed to grip the said edge and hold it until the operations of wrapping the paper around the said former and the closing and sealing of the end are completed. The edge of the paper is then released, and the mechanism for removing the bag coming into operation thrusts the said bag from off the former into the outer case or carton, which cartons, as previously stated, are placed by hand into receptacles formed on the periphery of an intermittently-actuated carrier-wheel. The carrier-wheel is so disposed with regard to the former that upon the rotation of the said wheel the receptacles thereon are brought successively into a position coincident with the former, thus enabling the bags to be thrust into the cartons. The means for subsequently removing the cartons from the carrier-wheel are connected to and actuated by the means for effecting the removal of the bags from the former.

In order that the invention may be the better understood, drawings are appended, in which—

Figure 2:
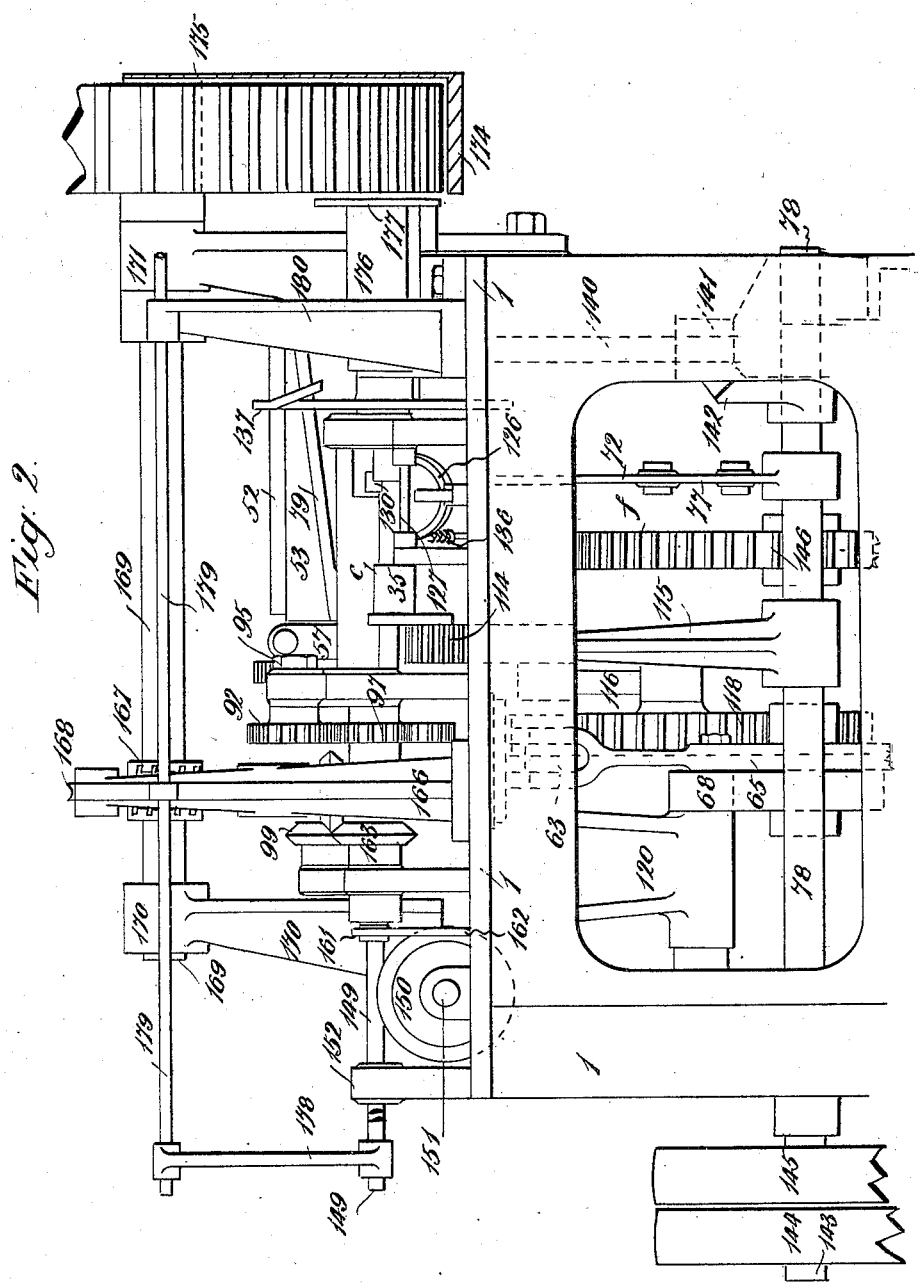
Figure 3:
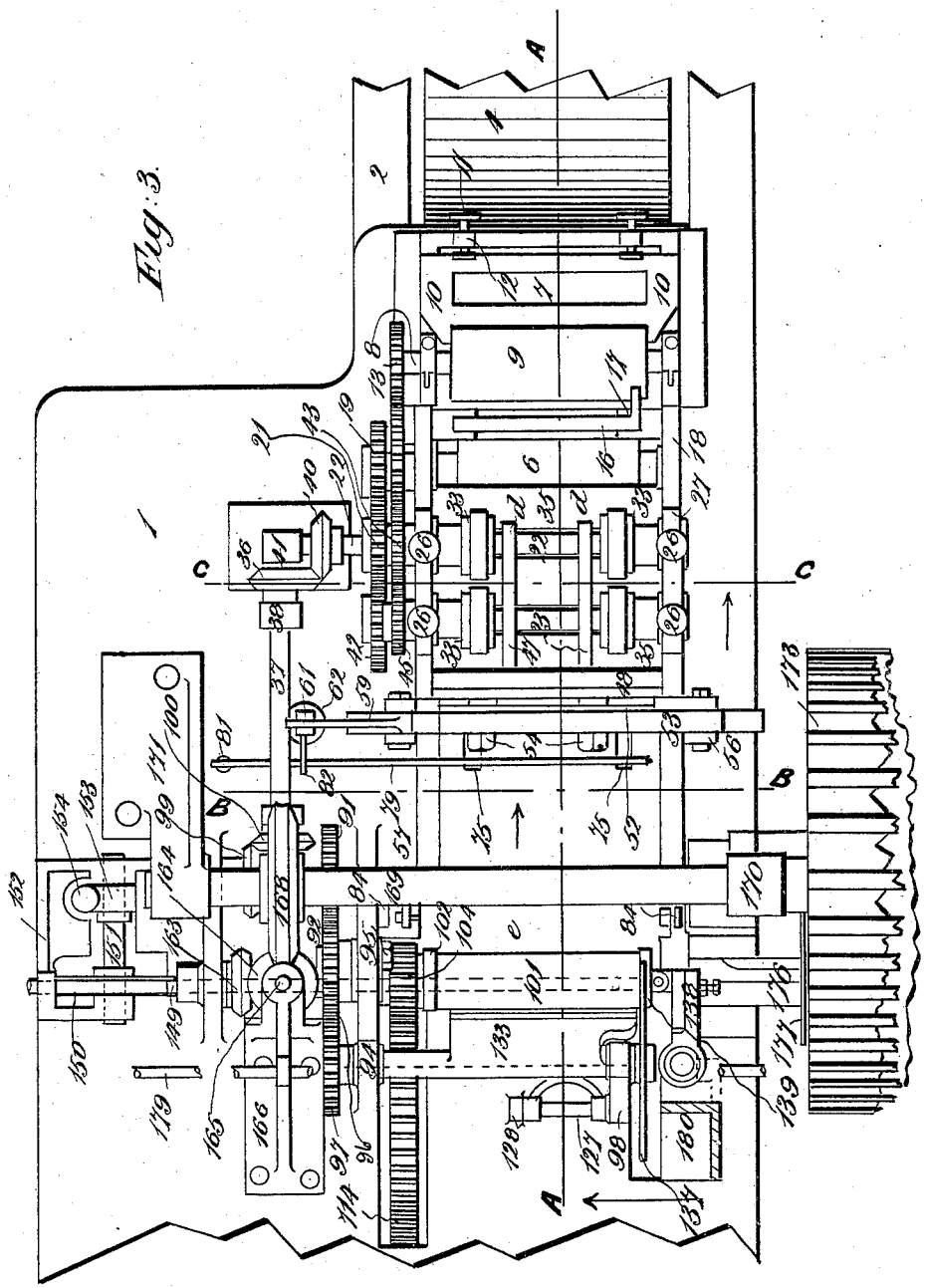

Figure 1 is a side elevational view of the machine, the figure being for convenience broken off and continued upon Sheet 2. Fig. 2 is an enlarged elevational view of the machine at the discharge end thereof. Fig. 3 is a plan of the machine. Fig. 4 is a longitudinal section upon line A A, Fig. 3. Fig. 5 is a view of the opposite side of the machine to that shown in Fig. 1. Fig. 6 is a transverse section of the machine upon line B B, Fig. 3. Fig. 7 is also a transverse section of the machine upon line C C, Fig. 3. In all of the sectional views the direction of vision is indicated by arrows. Fig. 8 is a part sectional view showing more clearly the operative mechanism for the various parts of the machine.

Figure 14:
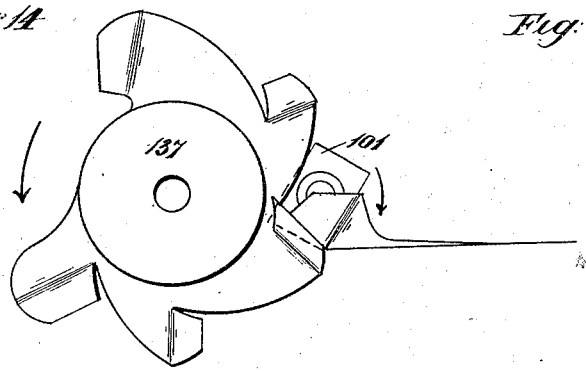
Figure 15:
Figure 16:
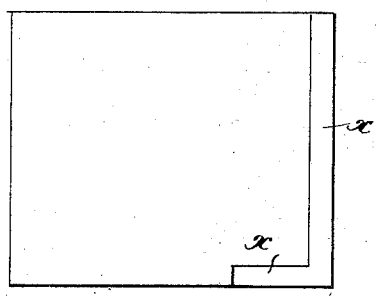
Figure 17:
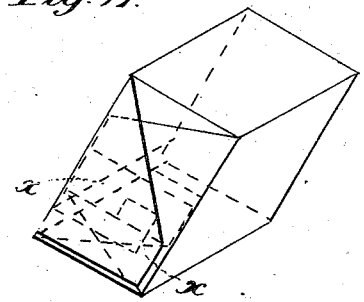
Figure 21:
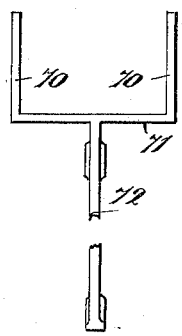
Figure 22:

Fig. 9 is a longitudinal view to an enlarged scale of the former upon which the bags are made, the clutch mechanism thereof being shown in section. Fig. 10 is an end view of the former. Fig. 11 is a sectional view illustrating a part of the clutch. Fig. 12 is a side elevational view of the bag, the last fold being in course of completion. Fig. 13 is a detached view of the plate for removing the bag from the former with the means for insuring the correct positioning of said plate. Fig. 14 is a side elevation showing approximately the appearance presented by the folder for closing the end of the bag. Fig. 15 is a side view of the folder. Fig. 16 is a plan showing approximately the shape of the paper blank and the position of the gummed surfaces thereof. Fig. 17 is a perspective view of the completed bag. Fig. 18 is a plan of the gummer. Fig. 19 is an end view of the gummer. Fig. 20 is a side elevation thereof. Figs. 21 and 22 are respectively a front and side elevational view of the feeding device for pushing the paper from the cutting mechanism onto the means whereby it is presented to the former. Fig. 23 is a detail view.

Referring to the drawings, 1 represents generally the supporting frame and table of the machine, to the front or entrant end of which is attached the supports 2 for a spindle 3, carrying the roll of web 4, from which the bags are to be formed. The paper is led from the said roll, against the surface of which bears the roller 5, upward to the roll 6, Figs. 1 and 4, passing around the periphery of the said roll, as indicated by the dotted line $a$ in Fig. 4, when it is in a position to receive the adhesive. The adhesive is contained within the reservoir 7, Figs. 1, 3, 4, and 5, which reservoir comprises a rectangular box-like body adjustably secured to the table of the machine and the sides of which are provided with bearings supporting the spindle 8, to which is secured the roller 9. The lower portion of the periphery of roller 9 is immersed in the adhesive, and an adjustable plate 10 is provided, which by means of the screws 11, passing through bosses 12 upon the end of the reservoir and into lugs or ears upon the plate 10, is adjusted so as to remove superfluous adhesive from the roller during the rotation thereof. The movement of the roller 9 is effected by means of the pinion 13, secured to end of spindle 8, which pinion is in gear with and operated by the pinion 14 upon the gummer-spindle 15. The gummer comprises an L-shaped plate 16, secured to or cast integral with the bosses 17, through which pass the spindle 15, before referred to. The construction of the gummer is clearly illustrated in Figs. 18, 19, 20. The edge of the plate 16 during the rotation of its spindle 15 comes into contact with the adhesive-coated outer surface of the roll 9 and from which it removes a portion of adhesive, which is transferred to the paper. The gummer-spindle 15 is carried in bearings formed at the ends of the vertical plates 18, which are in the present instance cast integral with the table of the machine and also serve to support the spindles of the feed mechanism.

As previously stated, the paper is led around roll 6, and it is while it is passing over the said roll that the plate 16 comes into contact with the upper surface of the paper and provides the said surface with a marginal coating of adhesive, which coating extends the full width of the paper, then in a continuous length, and also along the side. The extent of the gummed surface $x$ and its position with regard to the edges of the cut blank of paper are shown in Fig. 16.

The roller 6 is actuated by means of the pinion 19, secured to the spindle of the said roller and to which is also secured the smaller pinion 20, driving the pinion 14 of the gummer. The pinion 19 is actuated by the pinion 21, secured to the spindle 22 of the upper of the first pair of feed-rollers. The spindles of all the feed-rollers are supported by the vertical plates 18. The spindles 22 23 of the uppermost rollers are adjustably carried by the blocks 24, sliding in gaps or openings formed in the plates 18, and are adjusted by means of the screws 25 26, the upper of which, 26, pass through the plates 27, secured by bolts 28 to the top of the plates 18. The lower rollers 29 30 are carried by spindles, for which bearings 31 32 are formed in the said plates. The lower rollers may be formed solid or hollow of a length equal to the full width of the paper. The upper rollers comprise a number of short rollers 33, secured to the spindles 22 23 and having a peripheral band of rubber or the like 34. (See Figs. 3, 4, 7, and 23.) The upper feed-rollers are adjustably secured to their spindles in order that they may be spaced, so as to clear the gummed surface at the side of the paper, and their peripheral bands of rubber are also gapped, as shown in Fig. 23, so as to avoid contact with the transverse adhesive-coated surface. The paper passes between the lower and upper surfaces, respectively, of the feed-rollers and over the plate 35, which is slotted to permit of the projection therethrough of the lower rollers 29 30. (See Fig. 4.) The movement of the various rollers is effected by means of the miter-wheel 36, secured to the end of the spindle 37, carried at one end by the bearing 38 and at the other end by the bearing 39. The miter-wheel 36 is in gear with a similar wheel 40, secured upon the spindle 22, for which an end bearing 41 is provided. The pinion 21, before referred to, actuates a similar pinion 42 upon the lower one of the second pair of feed-rollers. A smaller pinion 43 is secured to the spindle 22, which operates a pinion 44, secured to the lower of the first pair of feed-rollers, the direction of motion of which is indicated by arrows in Fig. 4. A pinion 45 upon the spindle of the upper of the second pair of rollers is in gear with a pinion 46 upon the lower spindle and is actuated by said pinion 46. The direction of motion of the second pair of rollers is also indicated in Fig. 4.

Loosely mounted upon the spindle 22 are two collars d, (see Figs. 4 and 7,) from which project arms 47, turned over at their outer ends and secured to the bar 48, arranged transversely of the line of the web, upon which the said bar is intended to rest periodically when the same is being cut, and so prevent any slip or buckle of the paper and so insure the severed portions being of equal length. The periodic lifting of the bar 48 is effected by means of a cam 49, secured to the spindle 23, and which cam bears against the under surface of one of the arms 47. (See Fig. 4.) Located transversely of the bed of the machine is a cutting device comprising a fixed and movable blade. The fixed blade 50 is secured to the vertical portion 51 at the rear end of the plate 35. (See Fig. 4.) The movable blade 52 is carried by the plate 53, to which it is secured by bolts 54. The plate 53 is at one end pivotally supported by the bracket 55, formed integral with the table of the machine (see Fig. 6) and passes between guides 56 57, arranged upon either side of the surface over which the paper is fed. The plate at its opposite end is bent, as shown at 58, and has secured to it an arm 59, slotted at its outer end for the passage of a bolt 60, which serves to connect the part 59 with the forked upper end of the vertical rod 61. The rod 61 by which the vertical reciprocation of the upper cutting-blade is effected passes downward through a guide 62 on the table and at its lower end is secured to the end of the lever 63, supported by the bracket 64, secured to the under surface of the table. The opposite end of the lever is pivotally connected to the upper end of the lever 65, the lower end of which straddles the shaft 66 and is provided with a roller 67, engaging with a cam-race formed upon the disk 68. (See Figs. 1, 2, 4, 5 and 8.) The paper when severed falls onto the surface 69 and is advanced by means of the device shown in Figs. 1, 2, 3, 4, 6, 8, 21, and 22. The device referred to comprises two upwardly-projecting arms 70, attached to the ends of a horizontal member 71, from which depends a vertical member 72. The device is pivotally supported at 173 by means of a bracket 74, secured to the under side of the table of the machine. The upper ends of the arms 70 are somewhat hook-shaped in order to enable them to better engage the paper. Slots or openings 75 are formed in the surface 69, through which the arms project. A radial reciprocating motion is imparted to the said arms by means of the rod 76, connected at one end to the lower end of the member 72 and at the other end to the arm 77, secured to the shaft 78, to which, as will be hereinafter explained, a partial rotary motion only is imparted.

In order to prevent displacement of the paper as it falls from the shears, an arm 79 is provided, pivoted to the ears or lugs 80 upon the upper surface of the table and normally held in a raised position by means of the spring 81. A projection or pin 82 upon rod 61 during the downward movement of the said rod comes into contact with the arm and depresses the same, lunging the springs 83 thereon into contact with the upper surface of the paper, bearing it down upon the surface 69. The paper when upon the surface 69 is advanced by the device previously referred to and is carried forward by the plate e. The plate e is pivotally suspended from brackets 84 by means of the end pieces 85, formed thereon. A reciprocatory swinging movement is imparted to the plate, which transports the paper from the surface 69 and presents it edgewise to the former. The movement of the plate is effected by means of roller 87, carried by the support 88, secured to the upper surface of plate e. Secured to the inner end of the short spindle 89 is a nose-piece 90, which during the rotation of the said spindle comes into contact with the roller 87 and swings the plate into the position shown in Fig. 4 against the action of the coiled spring 91, which normally retains the plate in such a position that its surface is flush with the surface 69. The movement of the spindle 89 is effected by means of the pinion 91, secured thereto and meshing with the pinion 92, secured to the pin 93, attached to the vertical member 94 by means of the nut 95. (See Figs. 3 and 4.) The pinion 92 is actuated by means of a pinion 96, secured to the central portion of the former. (See Fig. 3.) The pinion 96 also actuates a pinion 97, secured to a spindle supported at one end by the member 94 and at the other end by the bracket 98. (See Fig. 3.) Also secured to the spindle 89 is a miter-wheel 99, which gears with a second wheel 100, secured to the end of the spindle 37, previously described in connection with the paper-feed.

The former upon which the bag is made comprises two rectangular blocks 101, secured at one end to a disk 102, having a sleeve 103, upon which is freely mounted the pinion 104. As illustrated in Figs. 9 and 10, the blocks 101 are channeled throughout their length, the channel so formed containing the cylindrical portion 105, extended at one end 106, where it passes through sleeve 103 and bearing 107, formed upon member 94. The pinion 96, before referred to, is secured to the extended portion 106. The portion 105 is provided with longitudinal wings 108, the longitudinal space 109 between the blocks 101 being sufficient to permit of a certain amount of movement on the part of the said wings in order to grip the edge of the paper when the same is introduced by plate 83 between the lower edge of the block and the upper surface of the wings. (See dotted line y, Fig. 10.) The position of the component members of the former is normally that indicated in Fig. 10. The position of the central portion is regulated by means of the springs 110, carried partly by the hollow lugs 111 112, and which springs abut at one end against the set-stud in the lugs 111 and at the other end are received by the recesses 113, formed in the lugs 112. The amount of movement of the former is one and one-half revolutions. The rotation of the former is in one direction only and is effected by means of the toothed sector 114, secured to the end of the arm 115, attached at its lower end to the shaft 78, before referred to. The arm 115 has attached to it one end of a connecting-rod 116, the opposite end of the rod being attached to a stud 117 upon the side of the toothed wheel 118, mounted upon spindle 119, for which a bearing is formed on the bracket 120, secured to the under side of the supporting-table. By this means reciprocatory motion is imparted to the sector 114 and at the same time a partial rotary movement to the shaft 78.

The movement of the former being intermittent and in one direction only is obtained from the pinion by means of the spring-governed studs 121, Figs. 9 and 11, which studs are contained within the recesses 122, formed in the side of the pinion 104. The studs are pressed forward by the springs 123 at their rear ends and engage with recesses 124, formed in the sides of the disk 102. The recesses 124, as indicated in Fig. 11, have an inclined surface 125 in one direction, which, coming into contact with the ends of the studs, forces the same inward against the springs 123 and permits the toothed wheel to be rotated independently of the former, which is thus stationary until the direction of motion of the sector is reversed, when the studs engage with the recesses and, coming into contact with the parallel side thereof, cause the former to participate in the rotation of the pinion 104.

From the foregoing description it will be seen that there is a certain amount of drag upon the central portion of the former caused by the resistance of the various wheels and mechanism which derive their motion therefrom, and this drag causes the center portion to remain stationary until the wings thereon come into contact with the edges of the former, overcoming the resistance of the springs 110 and permitting the whole device to rotate together. The movement of the outer portion of the former causes the edge of the paper to be gripped between the edge of the upper portion of the former and the upper surface of the wing. The length of the former is such as to permit of a certain length of paper extending beyond the end thereof, as shown by dotted lines in Fig. 9. This overhanging portion is afterward folded inward to form the end of the bag.

To insure the proper wrapping of the paper around the former, a means is provided designed to press successively upon each side of the bag during the formation thereof. The means employed comprises an arm 126, bifurcated at its front end, where it is secured to a spindle 127, carried by supports 128 and 98, secured to the table. The arm 126 has secured to it at its outer end an inclined plate 129, which may be covered with felt or the like, and which plate is alternately caused to bear against the side of the former and withdrawn. The movement of the arm is effected by means of a cam 130, secured to the spindle of the pinion 97, (see Fig. 4,) and which spindle carries at its end the device for closing the end of the bag. The cam during its rotation comes into contact with a roller 131, secured to the arm 126, and depresses the said arm against a spring 132. To insure the proper sealing of the adhesive coated longitudinal edge of the paper, I provide a plate 133, pivotally supported by the pin 134. The outer edge of the plate is caused when the former comes to rest to bear against the same at a point coincident with the gummed surface at the side of the bag. The necessary radial movement of the plate is effected by means of the depending trigger-shaped plate 135, Figs. 2 and 4, freely supported upon the spindle of the pinion 97 and which plate is actuated by a projecting pin or stud $b$ upon the face of the sector 114, (see Fig. 8,) which upon the completion of the rotation of the former comes into contact with plate 135 and turns it upon its spindle, causing a cam-piece $c$, Figs. 2 and 4, upon the boss of the plate to lift the plate 135 against the action of the spring 136 and bring the end of the said plate to bear against the side of the former, as aforesaid.

Arranged at the outer end of the former and with its plane surface flush therewith is a disk or plate 137, secured to the spindle of pinion 97. The disk is provided with a number of curved blades of approximately the form shown in Figs. 14 and 15 and which blades during the rotation of the former come into contact with the overhanging portion of the bag and successively turn or fold the same inward, as shown in Figs. 12, 14, 17, the latter figure illustrating the appearance of the end of the completed bag and Fig. 12 showing the position of the gummed portion by which the last fold is secured. To insure the proper adhesion of the last fold, I provide an arm 138, to the outer end of which is hinged a plate 139, adapted when the arm is operated to bear against the end of the bag, as shown in Fig. 3. The arm 138 is secured to the upper end of a vertical spindle 140, Figs. 1, 2, 3, 5, and 8, the lower end of which is supported by a bracket 141 and has secured to it a mutilated bevel-wheel in gear with and operated by a similar wheel 142, secured to the shaft 78. The movement of the shaft 78 is primarily obtained from the driving-shaft 143, upon which are fast and loose pulleys 144 145. A pinion 146 upon shaft 143 is in gear with and operates the larger pinion 118, before referred to in connection with the sector for actuating the former. The means employed for removing the bag from off the former comprises a plate 147, for which a recess 148 is formed in the end of the former to enable the plate to lie therein and present a flush surface with the end of the said former. The plate is revolubly secured to the end of a rod 149, which rod passes through the hollow central portion of the former and the continuation thereof (see Figs. 2, 3, 4, and 5) and is extended upon one side of the machine. The extended portion of the rod 149 has formed upon it a number of teeth designed to engage the pinion 150, Figs. 2 and 3, secured to the spindle 151, carried in bearings formed upon the frame 152. Secured to the spindle 151 is a small toothed wheel 153, with which engage teeth formed upon the vertical reciprocating rod 154. The rod 154 passes downward through the table and is attached at its lower end to a forked continuation 155, which straddles shaft 66 (see Fig. 5) and has secured to it a roller 156, engaging with a cam-race 157 upon disk 158, secured to said shaft 66.

The motion of the shaft 66 is obtained from the pinion 146 upon main shaft 143 in gear with pinion $f$. (Shown in Figs. 5 and 8.) To insure the proper positioning of the plate 147, I provide two pins 159, which pins project inwardly from the plate and pass into holes 160, formed in the rectangular members of the former. (See Figs. 9, 10, and 13.) The pins are of sufficient length to permit of their always engaging with holes 160 either when the plate is in its recess at the end of the former or extended to remove the bag therefrom. To prevent accidental rotation or overturning on the part of the former, I secure to the extension 106 of part 105 a disk 161, having formed in its periphery two cuts or recesses with which engages a detent upon the end of a spring 162. (See Fig. 2.) Also secured to the extension 106 is a miter-wheel 163, which wheel engages with a second wheel 164, secured to the vertical spindle 165, carried by the bracket 166. The spindle has attached to it a worm 167, engaging with a worm-wheel 168, secured to the transverse shaft 169, supported in bearings upon the brackets 170 171. Secured to one end of the shaft 169 is a wheel 172, provided upon its periphery with a number of radial projections 173, so spaced as to form a number of receptacles, each designed to contain one outer case or carton. The cartons are placed in the receptacles by hand, with the open ends thereof pointing inward, and are brought successively into a position in a line with the former, whereupon the bags are thrust off the former into the aforesaid outer cases. To retain the outer cases in position, a guard 174 is provided, which guard partially surrounds the periphery of the wheel and has a side plate 175, arranged so as to prevent the outer cases being thrust out when the bag is placed therein. To insure the proper delivery of the bag to the carton, a guide is provided consisting of a number of plates 176, which project inward from a plate 177, secured to the table of the machine and in which is formed an opening around which the plates 176 are disposed and of a size and outline corresponding to that of the bags, which pass therethrough into the outer case.

Secured to the reciprocating horizontal rod 149 is an arm 178, Figs. 2, 5, the upper end of which is attached to the outer end of the rod 179, supported by the bracket 166 at one end and by the bracket 180 at the other. This latter bracket is shown in full in Fig. 2 and partly in Fig. 3. The rod 179 is actuated by the rod 149 and serves the purpose of ejecting the cartons from the carrier-wheel after the bags have been placed therein.

The action of the machine is as follows: Motion being imparted from an external motor to the shaft 143 is transmitted by the pinion 146 to pinions 118 and $f$, secured, respectively, to shafts 119 and 66. The pinion 118 transmits motion by means of rod 116 to the sector 114 and this latter being in gear with the pinion 104, by which the former 101 is actuated. As the pinion 104 is capable of motion in one direction only, it follows that an intermittent motion is imparted to the former 101, and consequently to the various pinions which derive their motion therefrom. The gumming and paper-feeding device acting intermittently pull forward a length of paper, which is submitted to the action of the shears 50 52, the movable blade of which derives its motion from the rod 61, actuated by cam 68, lever 65, and lever 63. The paper is prevented from buckling and displacement before and after cutting, respectively, by means of the rods or bars 48 and 79 during their motion from cam 49 and rod 61. The paper when cut is passed forward toward the former by means of the oscillating arms 70, actuated by rod 76, attached to lever 77, secured to the partially-rotating shaft 78. The paper when pushed forward, as just described, is secured by the swinging horizontal plate $e$, actuated by nose-piece 90, secured to inner end of spindle 89, actuated through pinions 91, 92, and 96, attached to the central portion of the former 101. The paper is presented edgewise to the former, the longitudinal gummed margin being at the rear, and is gripped thereby, the closing of the edges of the former on the paper being effected by the inertia of the inner portion of the former, the said inner portion of which, as before stated, is actuated by the outer, which comes into contact with the projecting longitudinal wings of the said central portion and gripping the paper and carrying the component members of the former around together. The proper wrapping of the paper around the former is effected by means of the presser-foot 129, caused to bear against each side of the former successively by means of the cam 130, which alternately depresses the arm 126 and permits it to rise under the influence of spring 132. The spindle to which the cam 130 is secured is actuated by pinion 96 in gear with pinion 97 upon said spindle. The effective adhesion of the longitudinal seam of the paper is effected by means of the arm 133, caused, by means of the cam-surface c, to come into contact therewith upon the former 101 coming to rest. The movement of the arm is effected by pin b, projecting from the side of sector 114, and which pin comes into contact, upon the completion of its forward movement, with the depending trigger-shaped piece 135, turning the boss to which the cam c is attached and causing same to lift arm 133 against the spring 136, by which the piece 135 is positioned ready for engagement with pin b. The folding of the end of the bag thus formed is effected during the rotation of the former by means of the disk 137, the projecting portions of which come successively into contact with the end of the bag and turn same inward. The movement of the disk is effected by pinion 96, to the spindle of which the aforesaid disk is secured. The sealing of the end of the bag is completed by means of plate 139 upon arm 138, caused to come into contact with the end of the bag just prior to its removal from the former 101. The intermittent movement of the arm 138 is effected by the vertical spindle 140, to the end of which the arm is secured, and the mutilated miter-wheels 142, secured to the partially-rotating shaft 78, and a similar wheel secured to the spindle 140.

The completed bags are removed from the former and introduced into the cartons by means of the reciprocating rod 149, passing through the center of the former and actuated by pinion 150 upon shaft 151, actuated by rod 154 in gear with wheel 153 upon spindle 151. The rod 149 is reciprocated vertically by means of cam 158, secured to shaft 66. The cartons are carried by the intermittently-moving wheel 172, the periphery of which is provided with a number of receptacles designed each to contain a carton and which are retained until the bag has been introduced therein, when they are ejected. The movement of wheel 172 is effected by means of bevel-wheel 163, which operates a second wheel 164, secured to the end of vertical spindle 165. A worm 167 is secured to spindle 165 and actuates a worm-wheel 168, secured to spindle 169, to the outer end of which is attached the carrier-wheel for the cartons. The ejector for the cartons consists of a rod 179, the one end of which is attached to arm 178, connected to end of rod 149. The opposite end of rod 179 passes into the mouth of the bag and comes into contact with the end thereof and it and with it the carton out of the carrier-wheel.

Having now particularly described and ascertained the nature of my said invention and in what manner the same is to be performed, I declare that what I claim is—

1. The combination of means for holding a roll of paper, means for gumming the paper in transverse lines, means for feeding and severing the paper, a former having at one end a plate, a gripper upon said former, means for intermittently rotating said former and folding the paper thereon to form a bag with its open end at the end of the former opposite said plate, a rod to which said plate is connected, said rod passing through the former, means for moving said rod and plate so as to cast off the bag, a wheel having compartments for holding cartons, means for moving said wheel intermittently to present the cartons to said former, and means for ejecting the cartons from said wheel.

2. The combination with a bag-forming mechanism of a wheel having a series of receptacles for cartons, means for intermittently rotating said wheel, a stationary guard for retaining the cartons within said receptacles, means for thrusting bags from the forming mechanism into cartons held in said wheel, a guide for insuring a proper introduction of the bags within the cartons, and means for ejecting the cartons with their contained bags.

3. The combination of a former having at one end a plate, means for forming a bag upon said former with the open end of the bag at the end of the former opposite said plate, a rod to which said plate is connected, said rod passing through the former, a wheel having a series of receptacles for cartons, means for intermittently rotating said wheel, a stationary guard for retaining the cartons within said receptacles, means for moving said rod to thrust the bags from said former into cartons held in said wheel, a guide for insuring a proper introduction of the bags within the cartons, and means for ejecting the cartons with their contained bags.

4. The combination with bag-forming mechanism of a wheel having a series of receptacles for cartons, means for intermittently rotating said wheel, means for thrusting bags from the forming mechanism into cartons held in said wheel, a guide for insuring a proper introduction of the bags within the cartons, and means for ejecting the cartons with their contained bags.

5. The combination with gumming and severing means of a former having at one end a plate, means for forming a bag upon said former with the open end of the bag at the end of the former opposite said plate, a rod to which said plate is connected, said rod passing through the former, a wheel having a series of receptacles for cartons, means for intermittently rotating said wheel, means for moving said rod and plate to thrust the bags from the forming mechanism into cartons held in said wheel, and a guide for insuring a proper introduction of the bags within the cartons.

In witness whereof I have hereunto set my hand in presence of two witnesses.

EDWARD COLSTON LOVELL.

Witnesses:
JOHN ROBERTSON OWEN,
ANDREW WOOD WILKINSON.